(12) United States Patent
Bader et al.

(10) Patent No.: US 9,233,759 B2
(45) Date of Patent: Jan. 12, 2016

(54) POWER SUPPLY CIRCUIT FOR AN AIRCRAFT DE-ICING SYSTEM

(75) Inventors: Nicolas Alain Bader, Vaux le Penil (FR); Rachid Boudyaf, Alfortville (FR); Alexis Patouillard, Brunoy (FR); Sebastien Daniel Pierron, Antony (FR)

(73) Assignee: LABINAL POWER SYSTEMS, Blagnac (FR)

( * ) Notice: Subject to any disclaimer, the term of this patent is extended or adjusted under 35 U.S.C. 154(b) by 467 days.

(21) Appl. No.: 13/703,497

(22) PCT Filed: Jun. 6, 2011

(86) PCT No.: PCT/FR2011/051270
§ 371 (c)(1),
(2), (4) Date: Apr. 25, 2013

(87) PCT Pub. No.: WO2011/154645
PCT Pub. Date: Dec. 15, 2011

(65) Prior Publication Data
US 2013/0206902 A1    Aug. 15, 2013

(30) Foreign Application Priority Data

Jun. 11, 2010    (FR) ...................... 10 54627

(51) Int. Cl.
*B64D 41/00*    (2006.01)
*B64D 15/12*    (2006.01)
*F02K 1/00*    (2006.01)
*H02J 1/10*    (2006.01)
*H02J 3/00*    (2006.01)

(52) U.S. Cl.
CPC ............... *B64D 41/00* (2013.01); *B64D 15/12* (2013.01); *F02K 1/002* (2013.01); *H02J 1/10* (2013.01); *H02J 3/00* (2013.01); *B64D 2221/00* (2013.01); *H02J 3/005* (2013.01)

(58) Field of Classification Search
CPC ........ B64D 41/00; B64D 2221/00; H02J 3/00
USPC .......................................................... 244/58
See application file for complete search history.

(56) References Cited

U.S. PATENT DOCUMENTS 3,657,514 A * 4/1972 Adams ......................... 219/201
5,899,411 A * 5/1999 Latos et al. ................. 244/53 A
(Continued)

FOREIGN PATENT DOCUMENTS

EP    1 953 085           8/2008
EP    1953085 A1 *    8/2008    ............. B64D 15/12
(Continued)

OTHER PUBLICATIONS

International Search Report Issued Oct. 7, 2011 in PCT/FR11/51270 Filed Jun. 6, 2011.

*Primary Examiner* — Justin Benedik
(74) *Attorney, Agent, or Firm* — Oblon, McClelland, Maier & Neustadt, L.L.P.

(57) ABSTRACT

An aircraft electrical supply circuit including: a power distribution network, onboard the aircraft, for electrical devices located in an engine of the aircraft or near the engine; and a power supply generator built into the engine of the aircraft to supply AC voltage power to a deicing or anti-icing system. The power supply generator is connected to a thrust reverser electromechanical actuator by a rectifier for supplying DC voltage power to the actuator.

7 Claims, 1 Drawing Sheet

(56) References Cited

U.S. PATENT DOCUMENTS 6,992,403 B1 * 1/2006 Raad ............................ 307/47
2010/0283319 A1 11/2010 Boudyaf et al.

FOREIGN PATENT DOCUMENTS

FR 2 911 847 8/2008
WO 2004 037641 5/2004

* cited by examiner

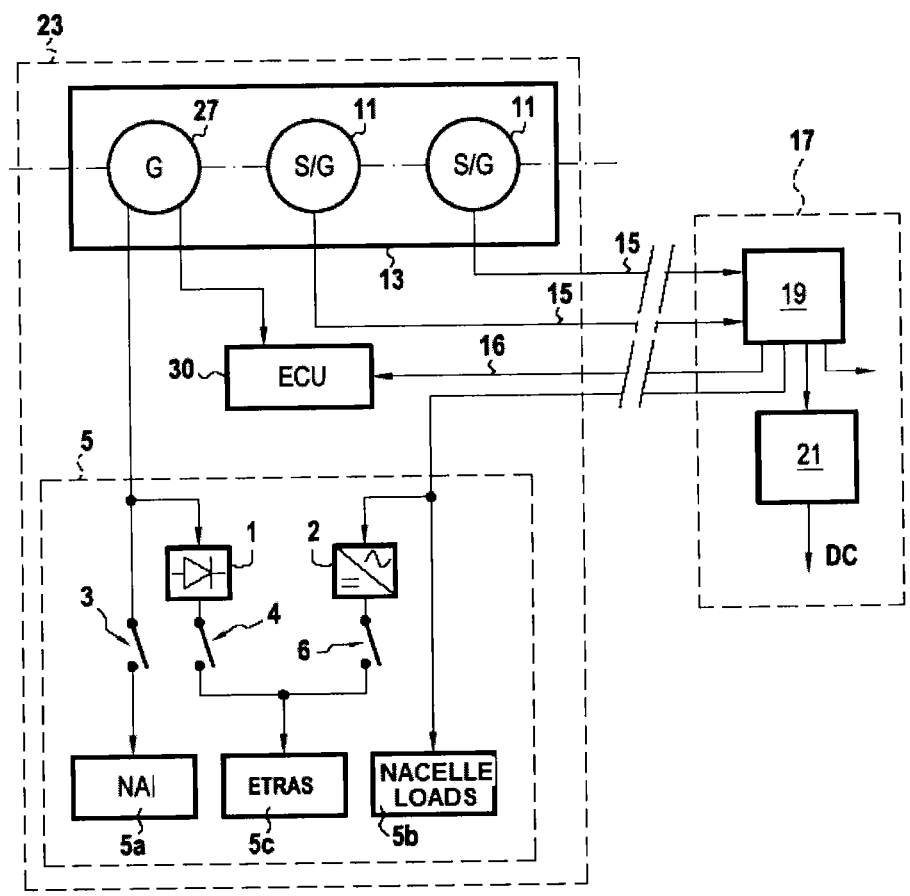

POWER SUPPLY CIRCUIT FOR AN AIRCRAFT DE-ICING SYSTEM

BACKGROUND OF THE INVENTION

The invention relates to the electrical power supply for electrical devices of an aircraft engine and/or its environment.

The field of application of the invention is more particularly that of airplane engines, in particular gas turbine engines.

The electrical devices of an aircraft engine or its environment here refers not only to electrical devices useful for the operation of the engine strictly speaking, but also electrical devices associated with the nacelle of the engine, for example such as nacelle anti-icing (NAI) electrical circuits or thrust reverse cowl opening system (TRCOS) actuators or electromechanical thrust reverse actuation control (ETRAC) actuators for a gas turbine airplane engine, or even associated with the wings supporting the engine, for example such as electrical deicing or anti-icing circuits of the airplane wing.

Document FR 2 911 848 describes an architecture in which the power supply and control circuit comprises two generators mounted on a transmission housing mechanically coupled to a turbine shaft of an aircraft engine. These generators are typically Starters/Generators (S/G) comprising a synchronous generator that is associated with an energizer and provides a variable-frequency AC voltage as a function of the engine rating, the energizer assembly and synchronous generator being controlled to run in synchronous engine mode when the turbine is started. The AC voltage supplied by the S/G is conveyed toward an electrical distribution network onboard the airplane, or an airplane electrical system. An airplane electrical system provides, via one or more distribution buses, a regulated AC voltage, typically 115 Vac or 230 Vac, having a frequency that varies as a function of the speed of rotation of the turbine shaft. The circuit also powers a voltage converter circuit that provides a regulated DC voltage, typically 270 Vdc or +/−270 Vdc, on one or more buses. The voltages produced supply different loads in the fuselage area of the airplane.

Besides, several electrical devices situated in the engine of the aircraft or in the engine environment are powered by a DC voltage supply bus, which in turn is powered by voltage converters connected to the AC voltage of the airplane onboard electrical network. These electrical devices may comprise an electromechanical thrust reverser actuator.

Furthermore, the power supply circuit also includes a power generator integrated into the engine of the aircraft to power a deicing or anti-icing circuit of the nacelle of the engine or a deicing circuit for a wing supporting the engine. This makes it possible to limit the length of the cable conveying the electricity toward the deicing circuit, and therefore to reduce the mass and bulk of the cables necessary to convey the electricity to loads outside the fuselage.

Despite the advantages of this architecture, the voltage converters that power the electrical devices in the engine area must be sized taking into account the power necessary for all of the devices, which can represent a significant mass and bulk. Furthermore, these voltage converters being connected to the airplane onboard electrical network, they must satisfy constraints in terms of harmonic limits not to be exceeded and current surge. These converters thus have a complex structure.

OBJECT AND SUMMARY OF THE INVENTION

The invention aims to provide an aircraft electrical power supply circuit that does not have the aforementioned drawbacks of the prior art.

To that end, the invention proposes an aircraft electrical power supply circuit including a power distribution network, onboard the aircraft, for electrical devices located in an engine of the aircraft or in the environment of said engine, a power supply generator integrated into the engine of the aircraft so as to supply AC voltage power to a deicing or anti-icing system, characterized in that the power supply generator is connected to a thrust reverser electromechanical actuator through a rectifier for supplying DC voltage power to said actuator.

Owing to these features, the thrust reverser electromechanical actuator can be powered from a same power supply generator as the deicing or anti-icing circuit, by means of the rectifier. It is therefore not necessary to provide a voltage converter intended to power the actuator from the distribution network during the operation thereof. Furthermore, the rectifier not being connected to the distribution network, it can be designed very simply, with a reduced mass and bulk and without requiring checking of requirements in terms of harmonic limit or surge current.

For example, said rectifier is a diode bridge.

In that case, the rectifier has a particularly simple structure, which is not particularly massive or bulky. Furthermore, it may show relatively low heat losses.

According to one embodiment, said network is connected to said actuator through a second rectifier.

The second rectifier makes it possible to power the thrust reverser actuator during maintenance. It may be sized for a weaker power.

According to one embodiment, an electronic engine control unit can regulate the AC voltage supplied by the power generator and control the closure of a switch located between the power generator and said actuator when said AC voltage reaches a predetermined level.

According to one alternative, the electronic engine control unit is capable of controlling a switch located between the power generator and the deicing or anti-icing circuit.

According to another alternative, the electronic engine control unit can control the deicing or anti-icing circuit to operate with reduced power.

The electrical energy distribution network onboard the aircraft can power said electrical devices via voltage converters.

The invention also provides an aircraft comprising an electrical power supply circuit according to the above invention.

BRIEF DESCRIPTION OF THE DRAWINGS

The invention will be better understood upon reading the following description, provided for information and non-limitingly, in reference to the appended drawings, in which FIG. 1 is a very diagrammatic view of a system for providing electrical power and controlling devices of an aircraft engine and its environment.

DETAILED DESCRIPTION OF THE INVENTION

FIG. 1 shows a diagram of a circuit for the electrical power supply and control of an assembly 5 comprising electrical devices of an aircraft engine and of its environment, in particular a gas turbine airplane engine.

The assembly 5 comprises a nacelle deicing or anti-icing circuit 5a (NAI) for a nacelle of the engine or a deicing circuit for a wing supporting the engine, an electromechanical actuator of an electrical thrust reverse actuation system (ETRAS), and several other electrical devices 5b useful for the operation of the engine and of its environment.

The circuit of FIG. 1 includes at least one generator 11, such as a S/G mounted on a transmission housing (shown by 13) mechanically coupled to a turbine shaft of the engine (not shown). The AC voltage supplied by the S/G generator(s) 11 is conveyed by one or more lines 15 to an electrical network 17 for distributing electrical energy onboard the airplane, or an airplane onboard electrical network. A circuit 19 of the airplane onboard network supplies, via one or more distribution buses, a regulated AC voltage, typically 115 Vac or 230 Vac, having a frequency varying as a function of the speed of rotation of the turbine shaft. The circuit 19 can also power a voltage converter circuit 21 that supplies a regulated DC voltage, typically 270 Vdc or +/−270 Vdc, via one or more buses. The voltages produced by the circuit 19 and 21 supply different loads in the fuselage area of the airplane.

The power supply circuit also includes, at the level of the engine (shown by 23), a power generator 27 integrated into the engine of the aircraft and supplying an AC voltage.

The power generator 27 powers the deicing circuit 5a. The deicing circuit 5a being purely resistive, it can be connected to the power generator 27 to receive the AC voltage, without an intermediate voltage converter. A switch 3 may be connected between the power generator 27 and the deicing circuit 5a.

The electrical devices 5b are powered from a circuit 19 via voltage converters (not shown). These voltage converters being connected to the electrical system 17, they meet requirements in terms of harmonic limit and surge current.

Lastly, the actuator 5c is connected to a rectifier 1 powered by the power generator 27 and to a rectifier 2 powered from the circuit 19. Switches 4 and 6 make it possible to connect the actuator 5c to the rectifiers 1 or 2.

Furthermore, the circuit of FIG. 1 comprises at least one engine control unit 30 (ECU). The ECU 30 is connected to the power generator 27, which can provide the ECU 30 with AC electrical power. Furthermore, the ECU 30 is also connected to the AC voltage circuit 19 by a line 16 to be able to be correctly powered when a sufficient engine speed has not been reached to ensure the supply of required electrical power by the power generator 27. The ECU 30 is capable of regulating the voltage supplied by the generator 27. The ECU 30 is also capable of controlling the switches 3, 4 and 6.

The operation of the circuit of FIG. 1 is as follows.

In flight, under icing conditions, the ECU 30 controls the closure of the switch 3 and the power generator 27 provides power to the deicing circuit 5a. Typically, the power necessary for the deicing circuit 5a may be of about 35 kW. The power generator 27 is sized accordingly.

Furthermore, in flight, thrust reversal is inhibited by the ECU 30, which controls the switches 4 and 6 to be in the open position. The actuator 5c is therefore not powered. Furthermore, to add further means of action seeking to inhibit thrust reversal, the ECU 30 can control locking of the thrust reverser and send a storage order to the actuator 5c.

On the ground, to activate thrust reversal, the ECU 30 controls the opening of the switch 3 and regulates the voltage supplied by the power generator 27 to an appropriate level for the actuator 5c. When this voltage level is reached, the ECU 30 controls the closure of the switch 4. The actuator 5c is then powered by the power generator 27 through the rectifier 1. Typically, the power necessary for the actuator 5c can be approximately 10 kW. The power generator 27 is thus capable of supplying the necessary power.

Since the rectifier 1 is not connected to the electrical network 17, it is not required to meet particular conditions in terms of harmonic limit or surge current. The rectifier 1 can therefore be designed very simply, with a reduced mass and bulk. Owing to this very simple structure, the rectifier 1 can show limited heat losses. For example, the rectifier 1 is a diode bridge.

The heat capacity of the deicing circuit 5a being relatively large, its powering may be interrupted temporarily without drawback, during the operation of the actuator 5c, by opening the switch 3. In one alternative, the switch 3 remains closed and the ECU 30 controls the deicing circuit 5a to operate with limited power. In that case, part of the power supplied by the power generator 27 can be used by the actuator 5c.

Lastly, during a maintenance operation, when the aircraft is on the ground, the engine is not running. The power generator 27 is therefore not rotated and does not supply electrical voltage. The electrical network 17 can be powered by a ground power unit or an auxiliary power unit (APU). The ECU can control the closure of the switch 6, which makes it possible to power the actuator 5c from the electrical network 17, via the rectifier 2.

The rectifier 2 can be sized only for the power necessary for the actuator 5c during a maintenance phase, i.e. when the speed of rotation of the engine and the aerodynamic forces are zero. This power is weaker than the power necessary for the actuator 5c during operation thereof, when it is powered by the power generator 27. The rectifier 2, which is sized for that lower power, can therefore have a reduced mass and bulk.

In one alternative not shown, a manual breaker located upstream from the rectifier 2 can be opened to prevent untimely opening of the thrust reversers during maintenance.

The invention claimed is:

1. An aircraft comprising:
    an aircraft engine; and
    an electrical power supply circuit, the electrical power supply circuit including an electrical power distribution network, onboard the aircraft, for electrical devices located in an engine of the aircraft or in an environment of the engine, and a power supply generator integrated into the engine of the aircraft and connected to a deicing or anti-icing system to supply AC voltage power to the deicing or anti-icing system,
    wherein the power supply generator is connected to a thrust reverser electromechanical actuator through a rectifier for supplying DC voltage power to the actuator.

2. The aircraft according to claim 1, wherein the rectifier is a diode bridge.

3. The aircraft according to claim 1, wherein the network is connected to the actuator through a second rectifier.

4. The aircraft according to claim 1, further comprising an electronic engine control unit configured to regulate the AC voltage supplied by the power generator to control closure of a first switch located between the power supply generator and the actuator when the AC voltage reaches a predetermined level.

5. The aircraft according to claim 4, wherein the electronic engine control unit is further configured to control a second switch located between the power supply generator and the deicing or anti-icing system.

6. The aircraft according to claim 4, wherein the electronic engine control unit is further configured to control the deicing or anti-icing system to operate with reduced power.

7. The aircraft according to claim 1, wherein the electrical power distribution network onboard the aircraft powers the electrical devices through voltage converters.

* * * * *